United States Patent
Taherzadeh Boroujeni et al.

(10) Patent No.: US 12,022,519 B2
(45) Date of Patent: Jun. 25, 2024

(54) PHYSICAL RANDOM ACCESS CHANNEL REPETITION AND RECEIVE-BEAM SWEEP AND ASSOCIATED BEAM REFINEMENT

(71) Applicant: QUALCOMM Incorporated, San Diego, CA (US)

(72) Inventors: Mahmoud Taherzadeh Boroujeni, San Diego, CA (US); Tao Luo, San Diego, CA (US); Juan Montojo, San Diego, CA (US); Peter Gaal, San Diego, CA (US); Yan Zhou, San Diego, CA (US); Iyab Issam Sakhnini, San Diego, CA (US); Jelena Damnjanovic, Del Mar, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 549 days.

(21) Appl. No.: 17/179,139

(22) Filed: Feb. 18, 2021

(65) Prior Publication Data

US 2021/0266974 A1  Aug. 26, 2021

Related U.S. Application Data

(60) Provisional application No. 62/980,095, filed on Feb. 21, 2020.

(51) Int. Cl.
*H04W 74/0833* (2024.01)
*H04B 17/318* (2015.01)
(Continued)

(52) U.S. Cl.
CPC ...... *H04W 74/0833* (2013.01); *H04B 17/318* (2015.01); *H04W 16/28* (2013.01);
(Continued)

(58) Field of Classification Search
CPC .... H04B 7/0695; H04B 7/088; H04B 17/318; H04W 16/28; H04W 24/08; H04W 24/10;
(Continued)

(56) References Cited

U.S. PATENT DOCUMENTS

| 10,256,877 B2 * | 4/2019 | Rao ........................ H04B 7/043 |
| 10,966,253 B2 * | 3/2021 | Kim ...................... H04W 74/00 |

(Continued)

FOREIGN PATENT DOCUMENTS

| EP | 3471497 A1 | 4/2019 |
| WO | 2018084498 A1 | 5/2018 |
| WO | 2018119754 A1 | 7/2018 |

OTHER PUBLICATIONS

Ericsson: "Remaining Details on RACH Procedure", 3GPP Draft, 3GPP TSG RAN WG1 NR Ad-Hoc#3, R1-1716155_Remaining Details on RACH Procedure, 3rd Generation Partnership Project (3GPP), Mobile Competence Centre, 650, Route Des Lucioles, F-06921 Sophia-Antipolis Cedex, France vol. RAN WG1, No. Nagoya, Japan, Sep. 18, 2017-Sep. 21, 2017, Sep. 17, 2017 (Sep. 17, 2017), XP051339613, 19 Pages, Retrieved from the Internet: URL: http://www.3gpp.org/ftp/Meetings_3GPP_SYNC/RAN1/Docs/ [retrieved on Sep. 17, 2017].

(Continued)

*Primary Examiner* — Frank Duong
(74) *Attorney, Agent, or Firm* — Shumaker & Sieffert, P.A.

(57) ABSTRACT

Aspects of the present disclosure relate to wireless communications, and more particularly, to techniques for beam refinement via physical random access channel (PRACH) repetition. A method that may be performed by a network entity includes determining resources to monitor for a PRACH transmission sent from a user equipment (UE) as part of a random access channel (RACH) procedure, performing receive beam sweeping when receiving PRACH (Continued)

repetitions sent using the determined resources, using results of the receive beam sweeping to refine one or more beams and to select a refined beam of the refined one or more beams, and using the selected refined beam for at least one of receiving a subsequent message from the UE as part of the RACH procedure or sending a subsequent message to the UE as part of the RACH procedure.

24 Claims, 15 Drawing Sheets

(51) Int. Cl.
| | | |
|---|---|---|
| H04W 16/28 | (2009.01) | |
| H04W 24/08 | (2009.01) | |
| H04W 24/10 | (2009.01) | |
| H04W 56/00 | (2009.01) | |
| H04W 74/00 | (2009.01) | |

(52) U.S. Cl.
CPC ........... *H04W 24/08* (2013.01); *H04W 24/10* (2013.01); *H04W 56/001* (2013.01); *H04W 74/008* (2013.01)

(58) Field of Classification Search
CPC . H04W 48/16; H04W 56/001; H04W 72/046; H04W 74/002; H04W 74/004; H04W 74/006; H04W 74/008; H04W 74/02; H04W 74/04; H04W 74/08; H04W 74/0833
See application file for complete search history.

(56) References Cited

U.S. PATENT DOCUMENTS

| | | | |
|---|---|---|---|
| 11,013,036 B2* | 5/2021 | Li | H04L 27/26132 |
| 11,395,339 B2* | 7/2022 | Ling | H04B 7/0695 |
| 11,483,859 B2* | 10/2022 | Rastegardoost | H04L 5/0051 |
| 11,601,981 B2* | 3/2023 | Ly | H04W 72/23 |
| 2021/0051707 A1* | 2/2021 | Rastegardoost | H04L 5/0051 |
| 2021/0058971 A1* | 2/2021 | MolavianJazi | H04L 5/0044 |
| 2021/0195654 A1* | 6/2021 | Lei | H04B 17/26 |
| 2022/0256612 A1* | 8/2022 | MolavianJazi | H04W 74/0833 |

OTHER PUBLICATIONS

International Search Report and Written Opinion—PCT/US2021/018739—ISA/EPO—dated Jun. 11, 2021.
Qualcomm Incorporated: "Multi-Beam RACH Procedure Aspects", 3GPP Draft, 3GPP TSG-RAN WG1 #86bis, R1-1610165_Multi-Beam RACH Procedure Aspects, 3rd Generation Partnership Project (3GPP), Mobile Competence Centre; 650, Route Des Lucioles; F-06921, Sophia-Antipolis Cedex; France, vol. RAN WG1, No. Lisbon, Portugal, Oct. 10, 2016-Oct. 14, 2016, Oct. 1, 2016 (Oct. 1, 2016), XP051159966, 3 pages, Retrieved from the Internet: URL:http://www.3gpp.org/ftp/tsg_ran/WG1_RL1/TSGR1_86b/Docs/ [retrieved on Oct. 1, 2016] the whole document.
ETSI TS 138 104: "5G; NR; Base Station (BS) radio transmission and reception (3GPP TS 38.104 version 15.7.0 Release 15)", ETSI TS 138 104 V15.7.0 (Oct. 2019), 235 Pages.
ETSI TS 138 214: "5G, NR, Physical Layer Procedures for Data (3GPP TS 38.214 version 16.2.0 Release 16)", ETSI TS 138 214 V16.2.0 (Jul. 2020), 167 Pages.

* cited by examiner

CONTENTION-BASED RANDOM ACCESS

PHYSICAL RANDOM ACCESS CHANNEL REPETITION AND RECEIVE-BEAM SWEEP AND ASSOCIATED BEAM REFINEMENT

CROSS-REFERENCE TO RELATED APPLICATION(S)

This application claims benefit of and priority to U.S. Provisional Application No. 62/980,095, filed Feb. 21, 2020, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for beam refinement via physical random access channel (PRACH) repetition.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a network entity. The method generally includes determining resources to monitor for a physical random access channel (PRACH) transmission sent from a user equipment (UE) as part of a random access channel (RACH) procedure. The method generally includes performing receive beam sweeping when receiving PRACH repetitions sent using the determined resources. The method generally includes using results of the beam sweeping to refine one or more beams and to select a refined beam from the refined one or more beams. The method generally includes using the selected refined beam for at least one of receiving a subsequent message from the UE as part of the RACH procedure or sending a subsequent message to the UE as part of the RACH procedure.

Certain aspects provide a method for wireless communication performed by a UE. The method generally includes determining RACH resources associated with one or more synchronization signal blocks (SSBs) beams for sending a PRACH transmission with repetition. The method generally includes sending PRACH repetitions using the resources corresponding to the determined RACH occasion if one or more conditions are met.

Certain aspects of the present disclosure provide an apparatus for wireless communication. The apparatus includes at least one processor, and a memory coupled to the at least one processor. The memory generally includes code executable by the at least one processor to cause the apparatus to determine resources to monitor for a PRACH transmission sent from a UE as part of a RACH procedure. The memory generally includes code executable by the at least one processor to cause the apparatus to perform receive beam sweeping when receiving PRACH repetitions sent using the determined resources. The memory generally includes code executable by the at least one processor to cause the apparatus to use results of the beam sweeping to refine one or more beams and to select a refined beam from the refined one or more beams. The memory generally includes code executable by the at least one processor to cause the apparatus to use the selected refined beam for at least one of receiving a subsequent message from the UE as part of the RACH procedure or sending a subsequent message to the UE as part of the RACH procedure.

Certain aspects provide an apparatus for wireless communication. The apparatus includes at least one processor, and a memory coupled to the at least one processor. The memory generally includes code executable by the at least one processor to cause the apparatus to determine RACH resources associated with one or more SSBs beams for sending a PRACH transmission with repetition. The memory generally includes code executable by the at least one processor to cause the apparatus to send PRACH repetitions using the resources corresponding to the determined RACH occasion if one or more conditions are met.

Certain aspects of the present disclosure provide an apparatus for wireless communication. The apparatus generally includes means for determining resources to monitor for a PRACH transmission sent from a UE as part of a RACH procedure. The apparatus generally includes means for performing receive beam sweeping when receiving PRACH repetitions sent using the determined resources. The apparatus generally includes means for using results of the beam sweeping to refine one or more beams and to select a refined beam from the refined one or more beams. The apparatus generally includes means for using the selected refined beam for at least one of receiving a subsequent message from the UE as part of the RACH procedure or sending a subsequent message to the UE as part of the RACH procedure.

Certain aspects provide an apparatus for wireless communication. The apparatus generally includes means for determining RACH resources associated with one or more SSBs beams for sending a PRACH transmission with repetition. The apparatus generally includes means for sending PRACH repetitions using the resources corresponding to the determined RACH occasion if one or more conditions are met.

Certain aspects of the present disclosure provide a computer readable medium storing computer executable code thereon for wireless communication. The computer readable medium generally includes code for determining resources to monitor for a PRACH transmission sent from a UE as part of a RACH procedure. The computer readable medium generally includes code for performing receive beam sweeping when receiving PRACH repetitions sent using the determined resources. The computer readable medium generally includes code for using results of the beam sweeping to refine one or more beams and to select a refined beam from the refined one or more beams. The computer readable medium generally includes code for using the selected refined beam for at least one of receiving a subsequent message from the UE as part of the RACH procedure or sending a subsequent message to the UE as part of the RACH procedure.

Certain aspects provide a computer readable medium storing computer executable code thereon for wireless communication. The computer readable medium generally includes code for determining RACH resources associated with one or more SSBs beams for sending a PRACH transmission with repetition. The computer readable medium generally includes code for sending PRACH repetitions using the resources corresponding to the determined RACH occasion if one or more conditions are met.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
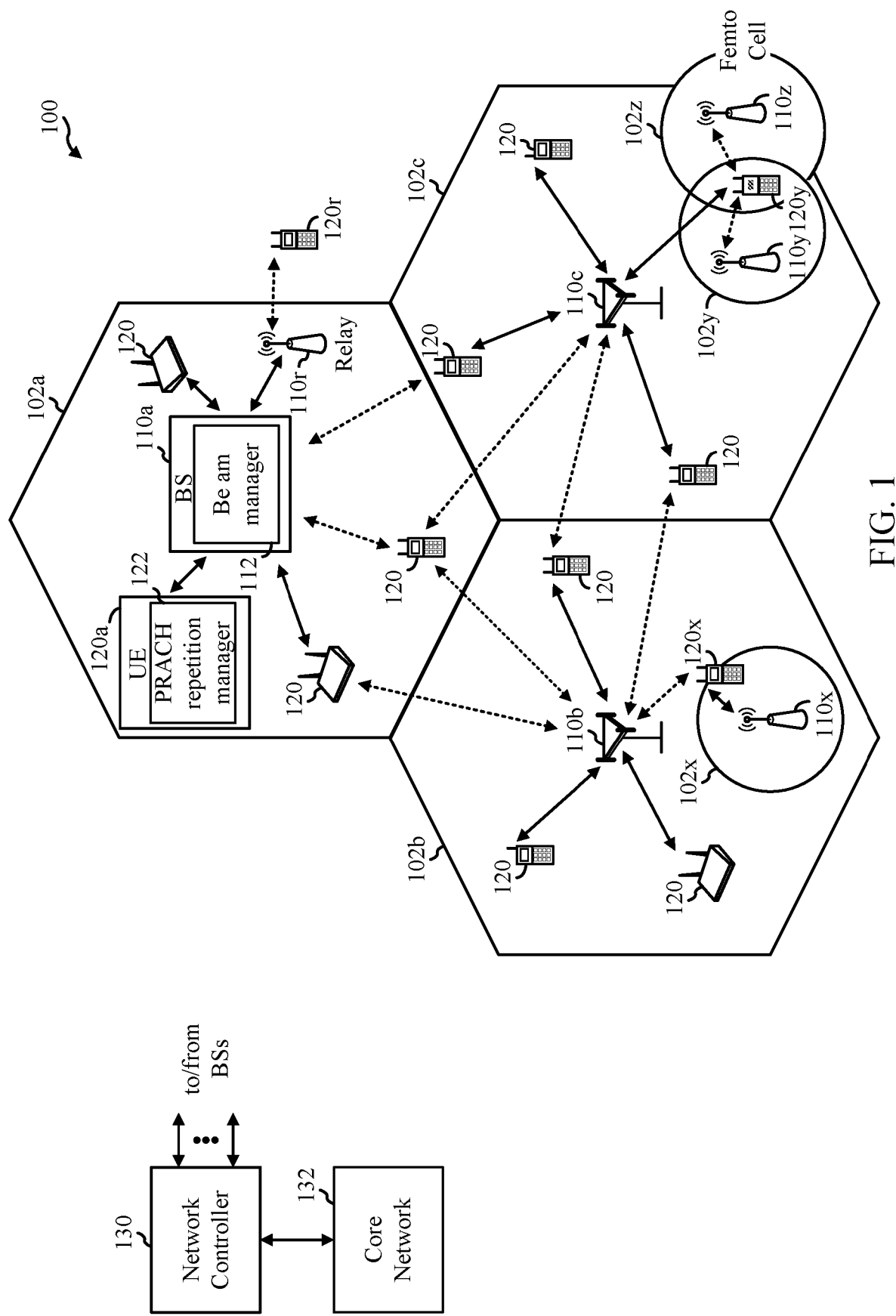
FIG. 1 is a block diagram conceptually illustrating an example wireless communication network, in accordance with certain aspects of the present disclosure.

Aspects of the present disclosure provide apparatus, methods, processing systems, and computer-readable mediums for beam refinement via physical random access channel (PRACH) repetition.

The following description provides examples of beam refinement via PRACH repetition in communication systems. Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured for beam refinement via PRACH repetitions. As shown in FIG. 1, the BS 110a includes a beam manager 112 that performs beam refinement based on PRACH repetitions, in accordance with aspects of the present disclosure. The UE 120a includes a PRACH repetition manager 122 that sends PRACH repetitions corresponding to a determined RACH occasion, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions for other UEs 120, to facilitate communication between devices.

A network controller 130 may couple to a set of BSs 110 and provide coordination and control for these BSs (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
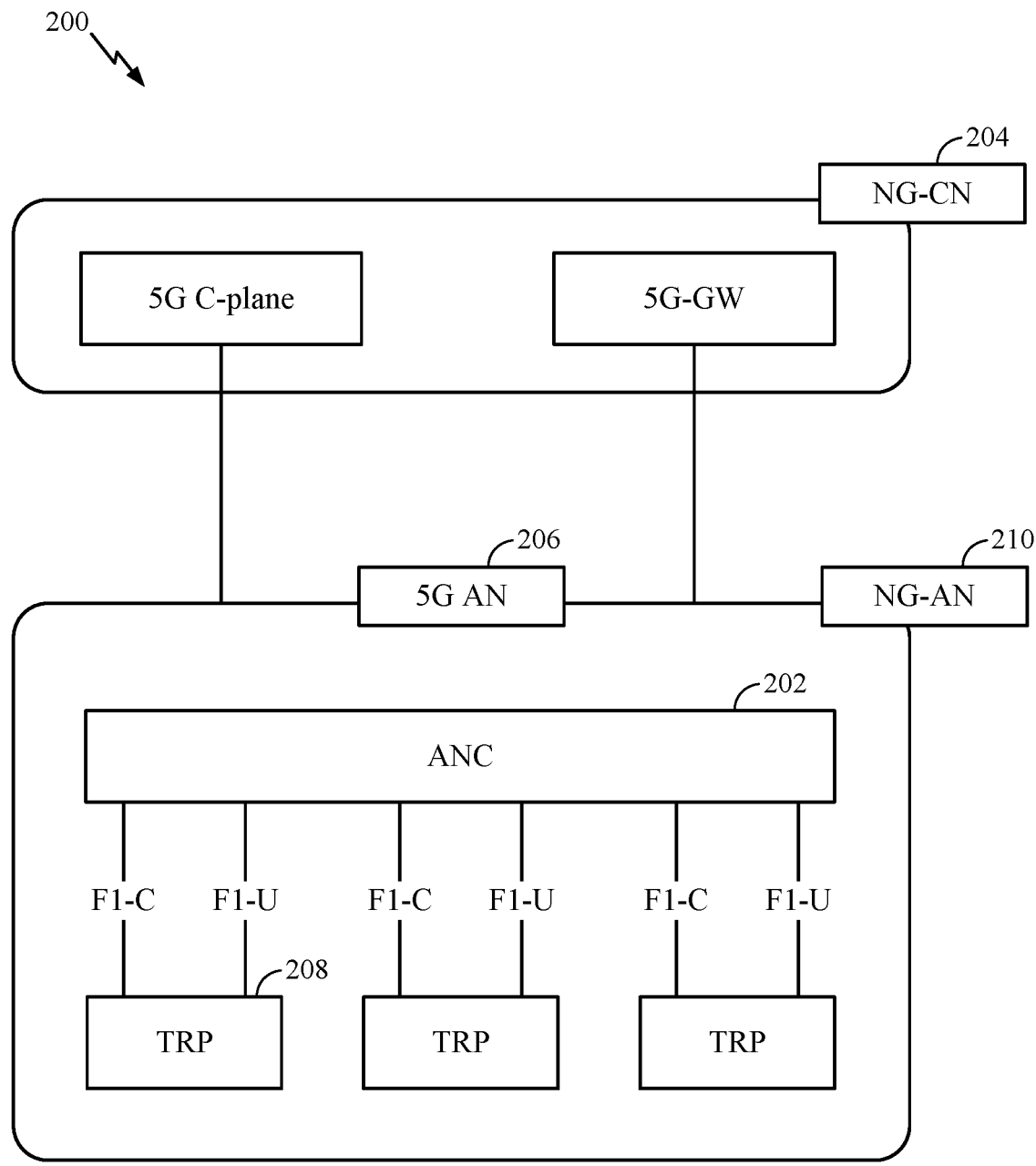
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support various backhauling and fronthauling solutions. This support may occur via and across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
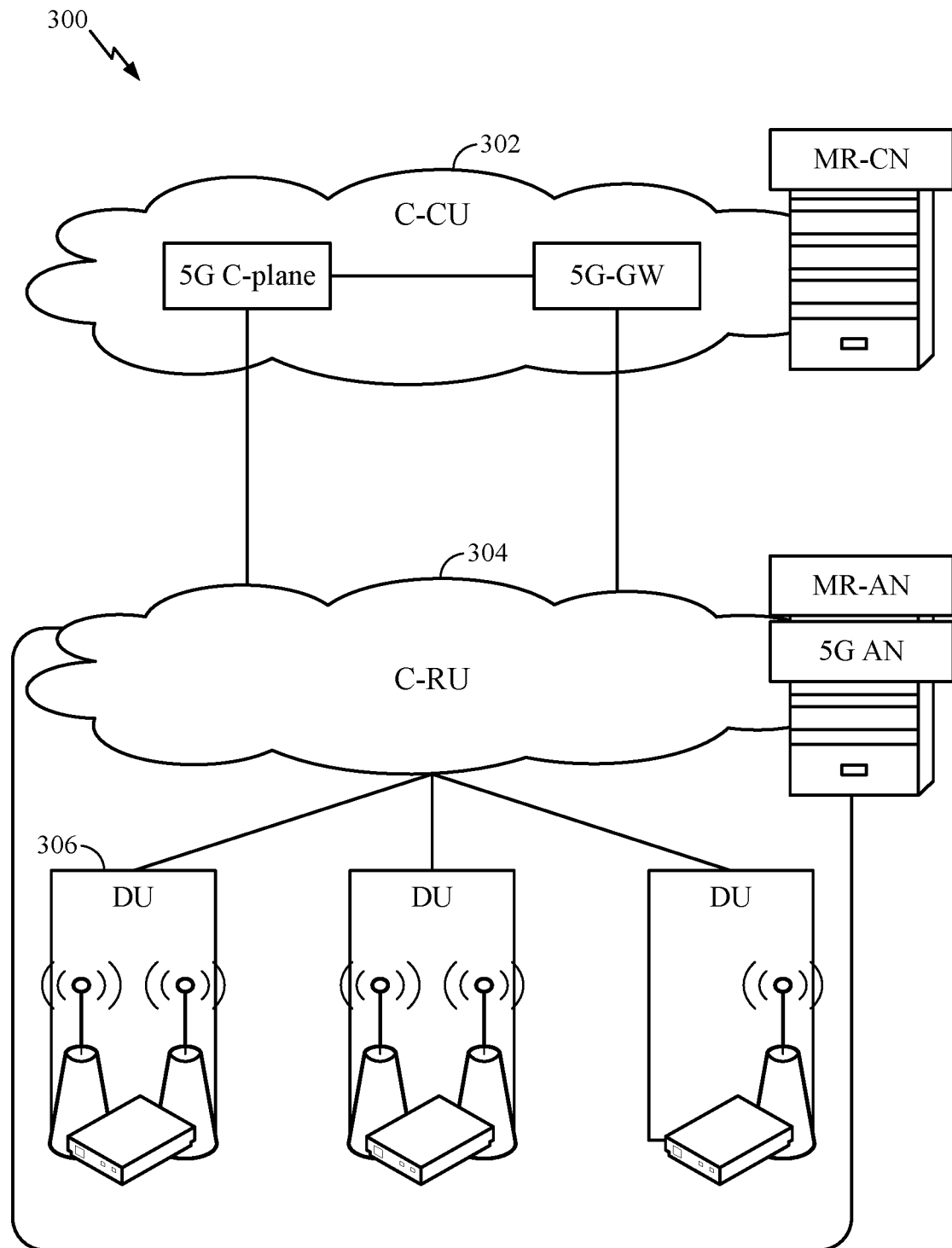
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
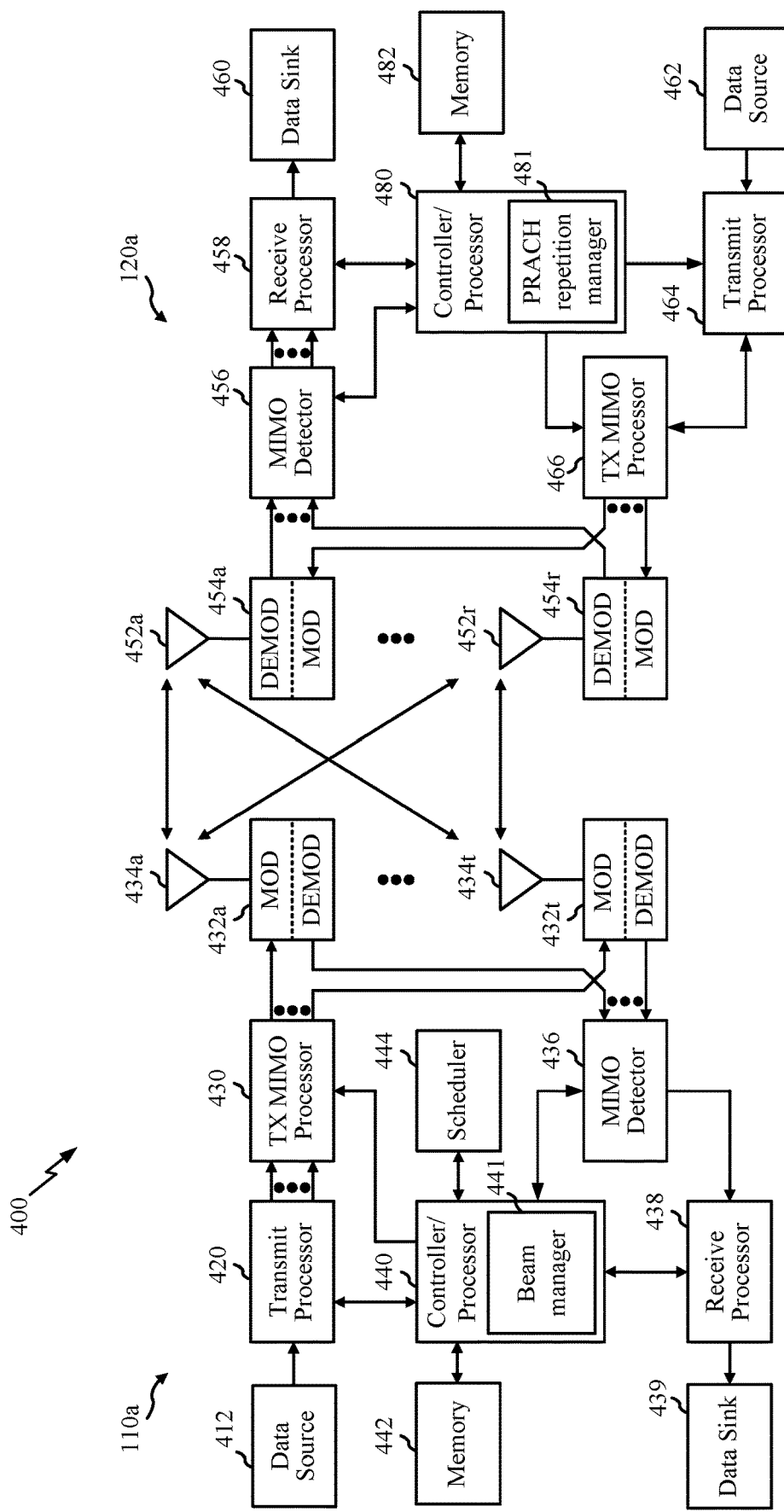
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) in transceivers 432a through 432t. Each modulator in transceivers 432a-432t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 432a through 432t may be transmitted via the antennas 434a through 434t, respectively.

At the UE 120, antennas 452a through 452r may receive downlink signals from the base station 110 and may provide received signals to demodulators (DEMODs) in transceivers 454a through 454r, respectively. Each demodulator in transceivers 454a-454r may condition (e.g., filter, amplify, down convert, and digitize) a respective received signal to obtain input samples. Each demodulator may further process input samples (e.g., for OFDM, etc.) to obtain received symbols. A MIMO detector 456 may obtain received symbols from all demodulators in transceivers 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, uplink signals from the UE 120 may be received by the antennas 434, processed by the modulators in transceivers 432a-432t, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct operations at the base station 110 and the UE 120, respectively. The processor 440 and/or other processors and modules at the BS 110 may perform or direct execution of processes for techniques described herein. The memories 442 and 482 may store data and program codes for BS 110 and UE 120, respectively. A scheduler 444 may schedule UEs for data transmission on the downlink and/or uplink.

The memories 442 and 482 may store data and program codes for BS 110a and UE 120a, respectively. A scheduler 444 may schedule UEs for data transmission on the downlink and/or uplink.

Antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein. For example, as shown in FIG. 4, the controller/processor 440 of the BS 110a has a beam manager 441 that performs beam refinement based on PRACH repetitions, according to aspects described herein. As shown in FIG. 4, the controller/processor 480 of the UE 120a has a PRACH repetition manager 481 that sends PRACH repetitions corresponding to a determined RACH occasion, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the downlink and on the uplink. OFDM and single-carrier frequency division multiplexing (SC-FDM) partition the system bandwidth into multiple (K) orthogonal subcarriers, which are also commonly referred to as tones, bins, etc. Each subcarrier may be modulated with data. Modulation symbols are sent in the frequency domain with OFDM and in the time domain with SC-FDM. The spacing between adjacent subcarriers may be fixed, and the total number of subcarriers may be dependent on the system bandwidth. The minimum resource allocation, called a "resource block" (RB), may be 12 consecutive subcarriers. The system bandwidth may also be partitioned into subbands. For example, a subband may cover multiple RBs. NR may support a base subcarrier spacing (SCS) of 15

KHz and other SCS may be defined with respect to the base SCS (e.g., 30 kHz, 60 kHz, 120 kHz, 240 kHz, etc.).

Figure 5:
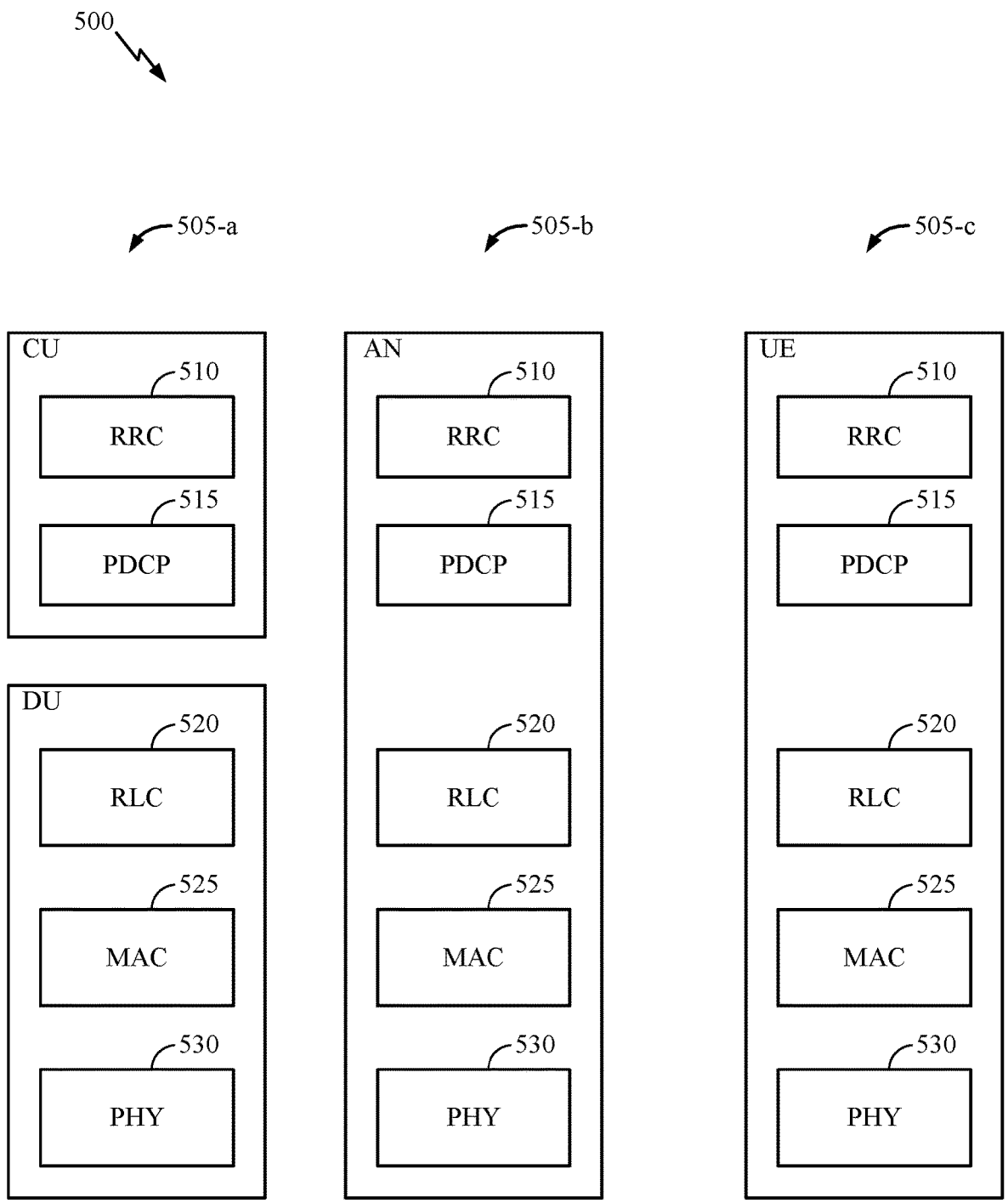
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
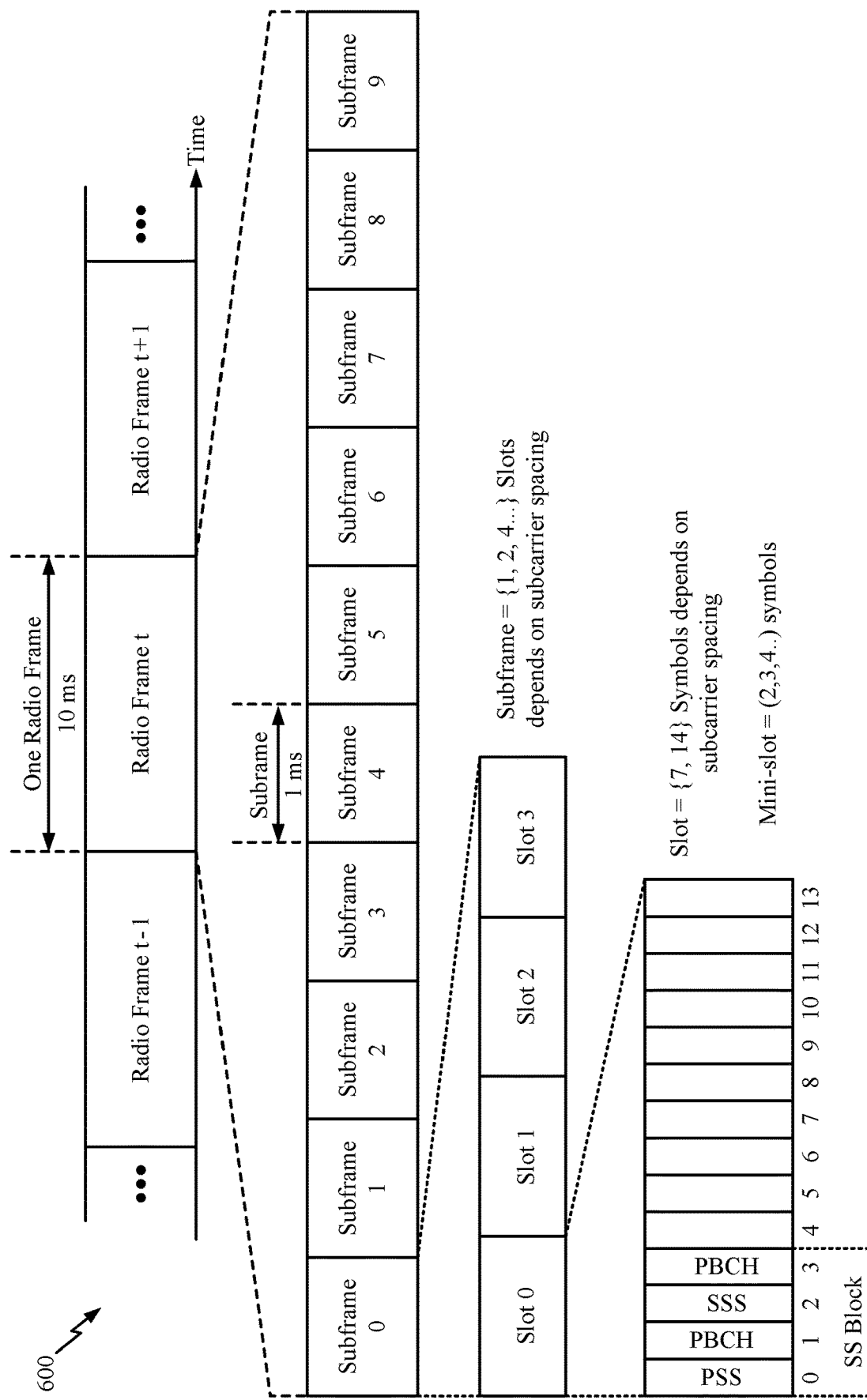
FIG. 6 illustrates an example frame format for certain wireless communication systems (e.g., new radio (NR)), in accordance with certain aspects of the present disclosure.
Figure 7:
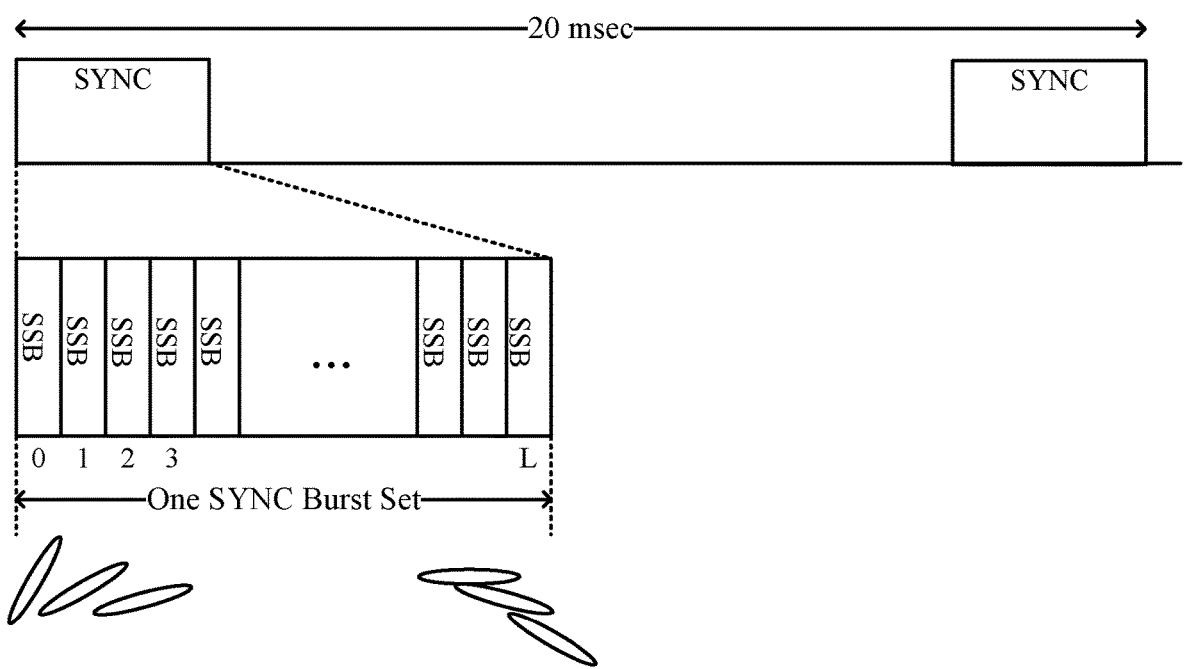
FIG. 7 illustrates how different synchronization signal blocks (SSBs) may be sent using different beams, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, ... slots) depending on the subcarrier spacing. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. In certain aspects, SSBs may be transmitted in a burst where each SSB in the burst corresponds to a different beam direction for UE-side beam management (e.g., including beam selection and/or beam refinement). The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Control Resource Sets (CORESETs)

A control resource set (CORESET) for an OFDMA system (e.g., a communications system transmitting PDCCH using OFDMA waveforms) may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. Search spaces are generally areas or portions where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Operating characteristics of a NodeB or other base station in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitors the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and SCS. In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 8:
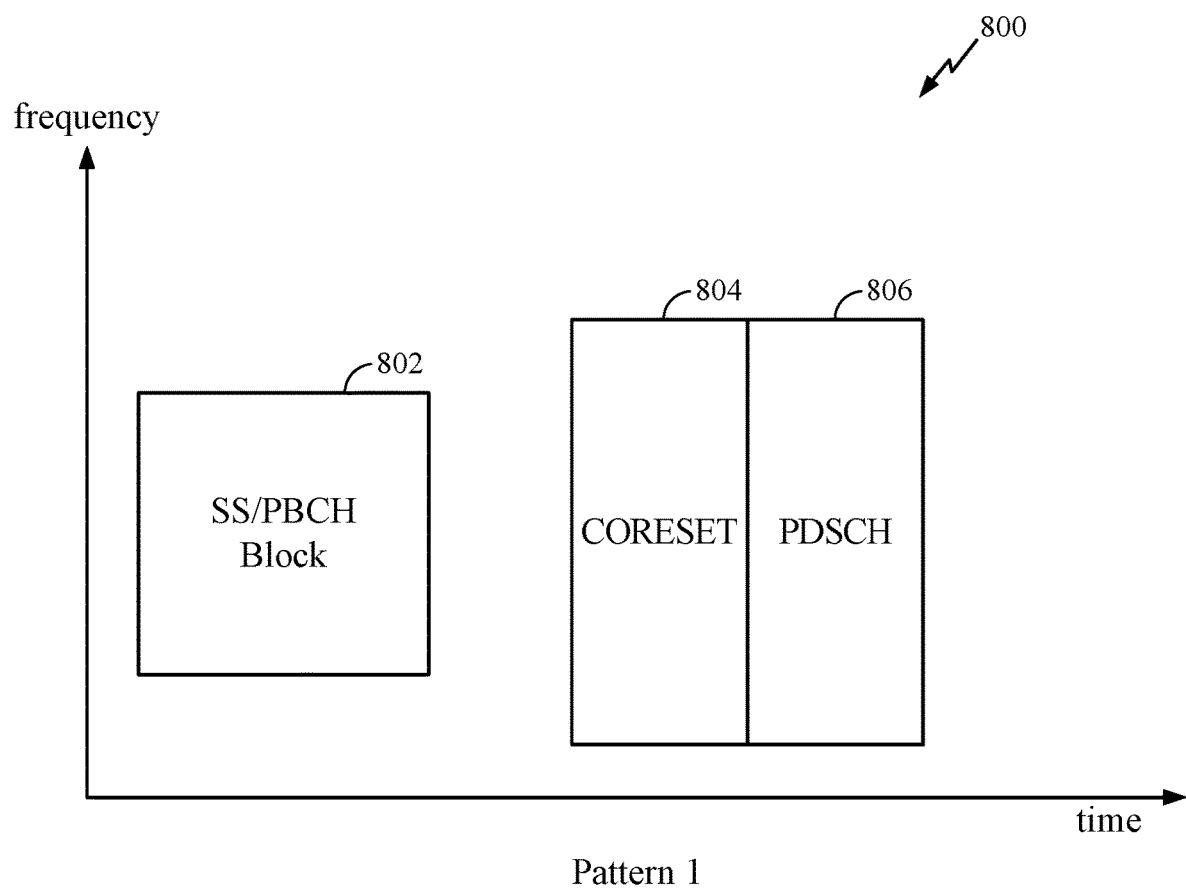
FIG. 8 shows an exemplary transmission resource mapping, according to aspects of the present disclosure.

FIG. 8 shows an exemplary transmission resource mapping 800, according to aspects of the present disclosure. In the exemplary mapping, a BS (e.g., BS 110a, shown in FIG. 1) transmits an SS/PBCH block 802. The SS/PBCH block includes a MIB conveying an index to a table that relates the time and frequency resources of the CORESET 804 to the time and frequency resources of the SS/PBCH block.

The BS may also transmit control signaling. In some scenarios, the BS may also transmit a PDCCH to a UE (e.g., UE 120, shown in FIG. 1) in the (time/frequency resources of the) CORESET. The PDCCH may schedule a PDSCH 806. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

QCL Port and TCI States

In many cases, it is important for a user equipment (UE) to know which assumptions it can make on a channel corresponding to different transmissions. For example, the UE may need to know which reference signals it can use to estimate the channel in order to decode a transmitted signal (e.g., physical downlink control channel (PDCCH) or physical downlink shared channel (PDSCH)). It may also be important for the UE to be able to report relevant channel state information (CSI) to the BS (gNB) for scheduling, link adaptation, and/or beam management purposes. In 5G new radio (NR), the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one CSI reference signal (CSI-RS) set and the PDSCH demodulation reference signals (DMRS) ports.

In some cases, a UE may be configured with up to M TCI-States. Configuration of the M TCI-States can come about via higher layer signalling, while a UE may be signalled to decode PDSCH according to a detected PDCCH with DCI indicating one of the TCI states. Each configured TCI state may include one RS set TCI-RS-SetConfig that indicates different QCL assumptions between certain source and target signals.

Figure 9:
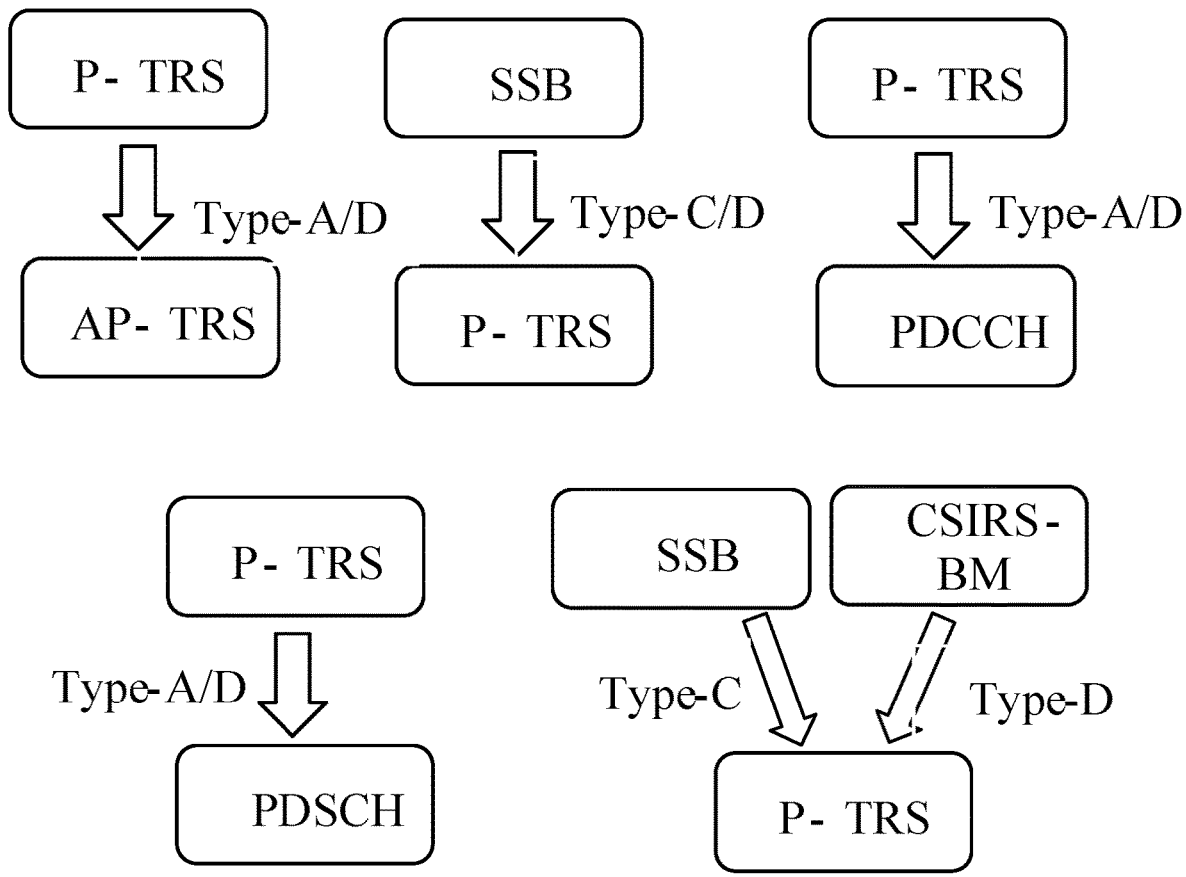
FIG. 9 illustrates example quasi co-location (QCL) relationships.

FIG. 9 illustrate examples of the association of DL reference signals with corresponding QCL types that may be indicated by a TCI-RS-SetConfig.

In the examples of FIG. 9, a source reference signal (RS) is indicated in the top block and is associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: physical uplink shared channel (PUSCH) DMRS, CSI-RS, tracking reference signal (TRS), and sounding reference signal (SRS).

As illustrated, each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

As illustrated in FIG. 9, for the case of two DL RSs, the QCL types can take on a variety of arrangements. For example, QCL types may not be the same, regardless of whether the references are to the same DL RS or different DL RSs. In the illustrated example, SSB is associated with Type C QCL for P-TRS, while CSI-RS for beam management (CSIRS-BM) is associated with Type D QCL.

QCL information and/or types may in some scenarios depend on or be a function of other information. For example, the quasi co-location (QCL) types indicated to the UE can be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

An initial CORESET (e.g., CORESET ID 0 or simply CORESET #0) in NR may be identified during initial access by a UE (e.g., via a field in the MIB). A ControlResourceSet information element (CORESET IE) sent via radio resource control (RRC) signaling may convey information regarding a CORESET configured for a UE. The CORESET IE generally includes a CORESET ID, an indication of frequency domain resources (e.g., number of RBs) assigned to the CORESET, contiguous time duration of the CORESET in a number of symbols, and Transmission Configuration Indicator (TCI) states.

As noted above, a subset of the TCI states provide quasi co-location (QCL) relationships between DL RS(s) in one RS set (e.g., TCI-Set) and PDCCH demodulation RS (DMRS) ports. A particular TCI state for a given UE (e.g., for unicast PDCCH) may be conveyed to the UE by the Medium Access Control (MAC) Control Element (MAC-CE). The particular TCI state is generally selected from the set of TCI states conveyed by the CORESET IE, with the initial CORESET (CORESET #0) generally configured via MIB.

Search space information may also be provided via RRC signaling. For example, the Search Space IE is another RRC IE that defines how and where to search for PDCCH candidates for a given CORESET. Each search space is associated with one CORESET. The Search Space IE identifies a search space configured for a CORESET by a search space ID. In an aspect, the search space ID associated with CORESET #0 is Search Space ID #0. The search space is generally configured via PBCH (MIB).

Example RACH Procedure

A random-access channel (RACH) is so named because it refers to a wireless channel (medium) that may be shared by multiple user equipments (UEs) and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Typically, a UE monitors synchronization signal block (SSB) transmissions which are sent (by a gNB using different beams) and are associated with a finite set of time/frequency resources defining RACH occasions (ROs). As will be described in greater detail below, upon detecting an SSB, the UE may select an RO associated with that SSB for a msgA transmission. The finite set of ROs may help reduce monitoring overhead (blind decodes) by a base station. In other words, by associating a finite set of ROs with SSB transmissions, a gNB knows when, where, and in what direction to "listen" for RACH transmissions from a UE.

Figure 10:
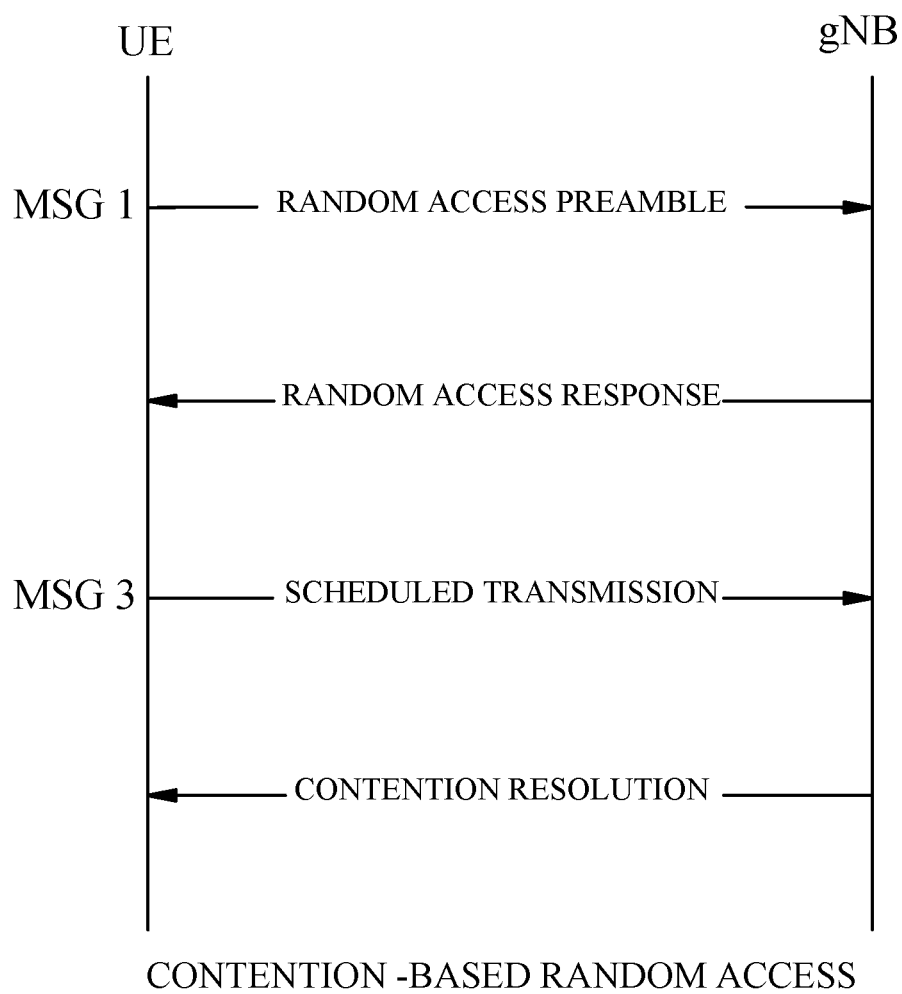
FIG. 10 is a timing diagram illustrating an example four-step RACH procedure, in accordance with certain aspects of the present disclosure.

FIG. 10 is a timing (or "call-flow") diagram 1000 illustrating an example four step RACH procedure, in accordance with certain aspects of the present disclosure. A first message (e.g., MSG1) may be sent from the UE 120 to BS 110 on the physical random access channel (PRACH). In this case, MSG1 may only include a RACH preamble. BS 110 may respond with a second message (e.g., MSG2, a random access response (RAR) message), which may include the identifier (ID) of the RACH preamble, a timing advance (TA), an uplink grant, cell radio network temporary identifier (C-RNTI), and a back off indicator. The RAR message may include a physical downlink control channel (PDCCH) communication including control information for a following communication on the physical downlink shared channel (PDSCH), as illustrated. In response to the RAR message, a third message (e.g., MSG3) is transmitted from the UE 120 to BS 110 on the PUSCH. The third message may include one or more of a RRC connection request, a tracking area update request, a system information request, a positioning fix or positioning signal request, or a scheduling request. The BS 110 then responds with a fourth message (MSG4) which may include a contention resolution message. In contention-free random access, the preamble is assigned to the UE and last two messages are skipped.

As noted above, the UE sends a preamble on a RACH occasion associated with a prior SSB transmission by the gNB. RACH procedures used for different purposes including initial access, synchronization, uplink scheduling request, beam-recovery, and the like. A RACH configuration of a cell typically specifies a number of SSB time indices per RACH time/frequency occasions (which could be one, less than one or greater than one).

In some cases, to speed access, a two-step RACH procedure may be supported. As the name implies, the two-step RACH procedure may effectively "collapse" the four messages of the four-step RACH procedure into two "enhanced" messages.

A first enhanced message (msgA) may be sent from a UE to a BS. In certain aspects, msgA includes some or all the information from the first message (e.g., MSG1) and the third message (e.g., MSG3) from the four step RACH procedure, effectively combining MSG1 and MSG3. For example, msgA may include MSG1 and MSG3 multiplexed together such as using one of time division multiplexing or frequency-division multiplexing. In certain aspects, msgA includes a RACH preamble for random access and a payload. The msgA payload, for example, may include the UE-ID and other signaling information (e.g., buffer status report (BSR)) or scheduling request (SR). The BS may respond with a RAR message (e.g., msgB), which may effectively combine the second message (e.g., MSG2) and the fourth message (e.g., MSG4) described above. For example, msgB may include the ID of the RACH preamble, a timing advance (TA), a back off indicator, a contention resolution message, UL/DL grant, and transmit power control (TPC) commands.

The techniques described herein may utilize both 4-step and 2-step RACH procedures and mechanisms.

Example PRACH Repetition and Receive-Beam Sweep

Certain aspects of the present disclosure provide techniques for network-side beam refinement based on physical random access channel (PRACH) repetition. The beam refinement, resulting from the beam sweep, may be used for reception of a third message (e.g., MSG3) and/or transmission of a second message (e.g., MSG2) in a four-step random access channel (RACH) procedure.

These techniques may improve system performance as MSG2 and MSG3 are bottlenecks for coverage of millimetre-wave 5G. In some cases, RACH procedures may create a bottleneck because there are no narrowbands available and thus the RACH procedures relies on wide broadcast beams based on synchronization signal block (SSB) beams, resulting in reduced beam gain. With reduced beam gain, coverage issues occur. One way to address coverage issues is to introduce coverage enhancement through repetition and/or beam refinement.

Figure 11:
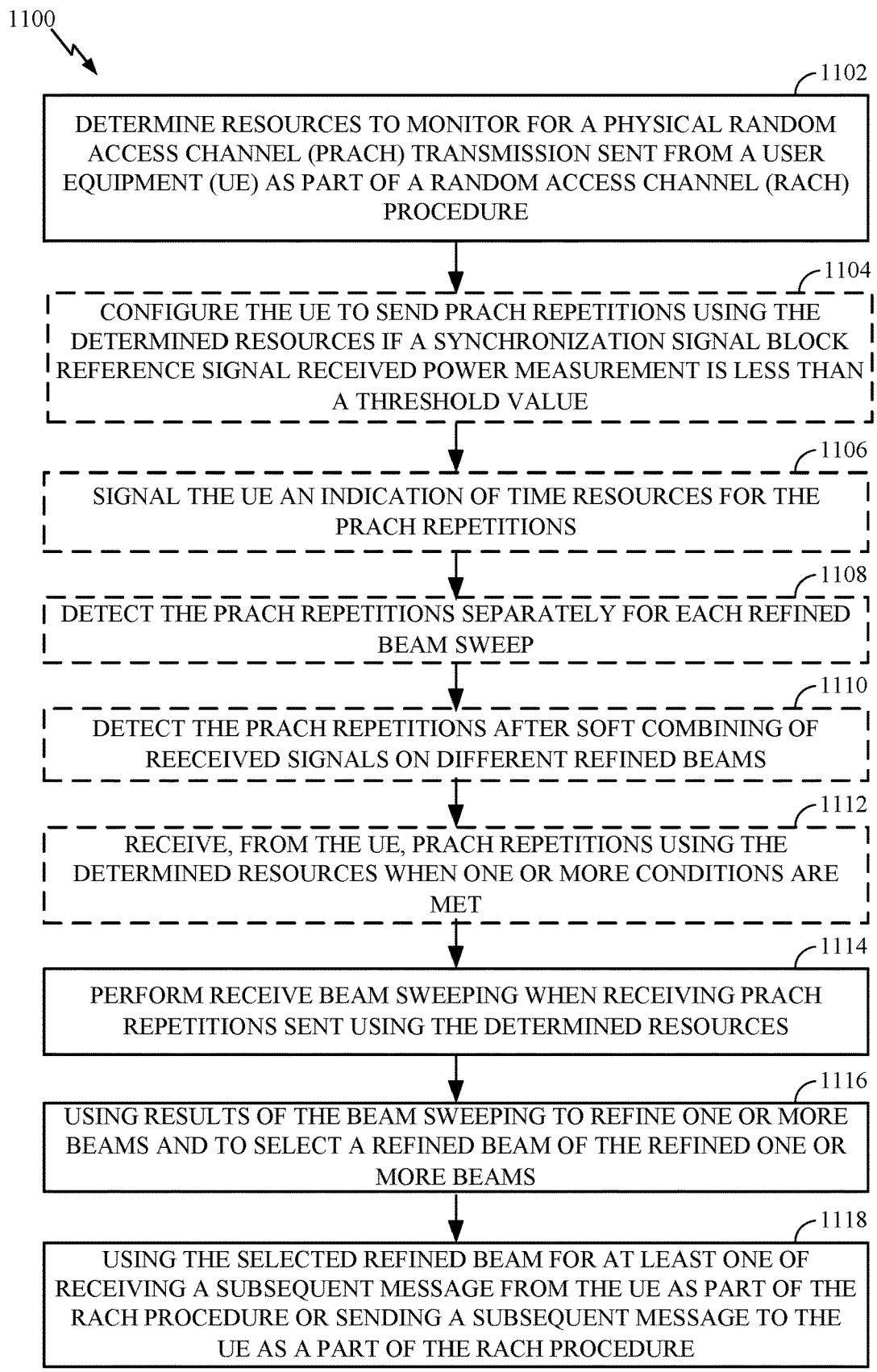
FIG. 11 is a flow diagram illustrating example operations for wireless communication by a UE, in accordance with certain aspects of the present disclosure.

FIG. 11 is a flow diagram illustrating example operations 1100 for wireless communication by a network entity. For example, operations 1100 may be performed, for example, by a base station (BS) 110 (e.g., a gNB).

Operations 1100 begin, at 1102, with the network entity determining resources to monitor for a PRACH transmission sent from a user equipment (UE) as part of a random access channel (RACH) procedure.

In some aspects, at 1104, the network entity may configure the UE to send PRACH repetitions using the determined resources if the SSB-based reference signal received power (RSRP) measurement is less than a threshold value.

In some aspects, at 1106, the network entity may signal the UE an indication of time resources for the PRACH repetitions.

In some aspects, at 1108, the network entity may detect the PRACH repetitions separately for each refined beam sweep.

In some aspects, at 1110, the network entity may detect the PRACH repetitions after soft combining of received signals on different refined beams of the refined one or more beams.

In some aspects, at 1112, the network entity may receive, from the UE, PRACH repetitions using the determined resources when one or more conditions are met.

At 1114, the network entity performs receive beam sweeping when receiving PRACH repetitions sent using the determined resources.

At 1116, the network entity uses results of the beam sweeping to refine one or more beams and to select a refined beam from the refined one or more beams.

At 1118, the network entity uses the selected refined beam for at least of receiving a subsequent message from the UE as part of the RACH procedure or sending a subsequent message to the UE as part of the RACH procedure.

Figure 12:
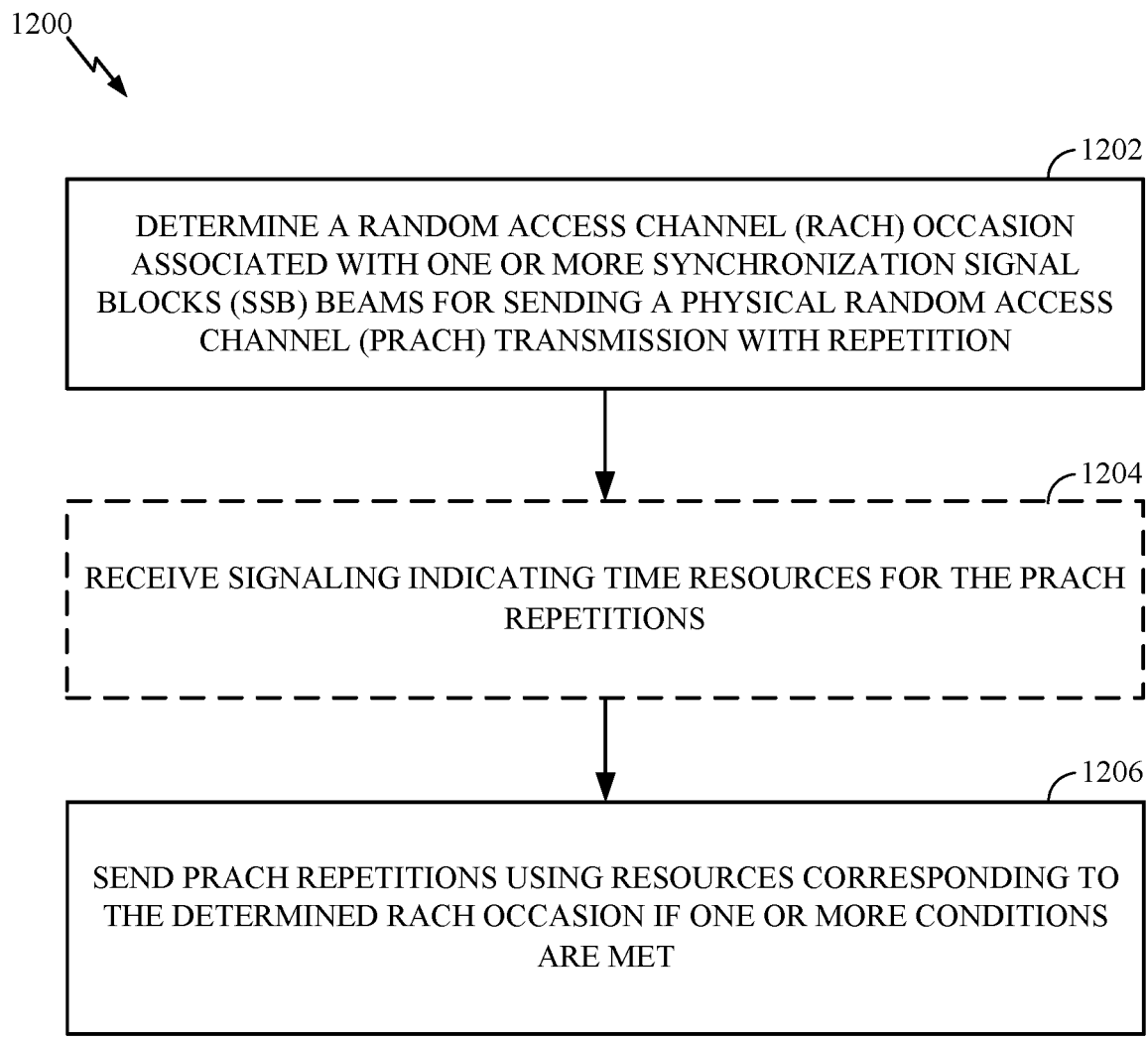
FIG. 12 is a flow diagram illustrating example operations for wireless communication by a network entity, in accordance with certain aspects of the present disclosure.

FIG. 12 is a flow diagram illustrating example operations 1200 for wireless communication by a UE, and may be considered complementary to operations 1100 of FIG. 11. The operations 1200 may be performed, for example, by a UE 120 in conjunction with a BS 110 performing operations 1100 of FIG. 11.

Operations 1200 begin, at 1202, with the UE determining a RACH occasion associated with one or more synchronization signal blocks (SSBs) beams for sending a PRACH transmission with repetition.

In some aspects, at 1204, the UE may receive signaling indicating time resources for the PRACH repetitions.

At 1206, the UE sends PRACH repetitions using resources corresponding to the determined RACH occasion if one or more conditions are met.

Figure 13:
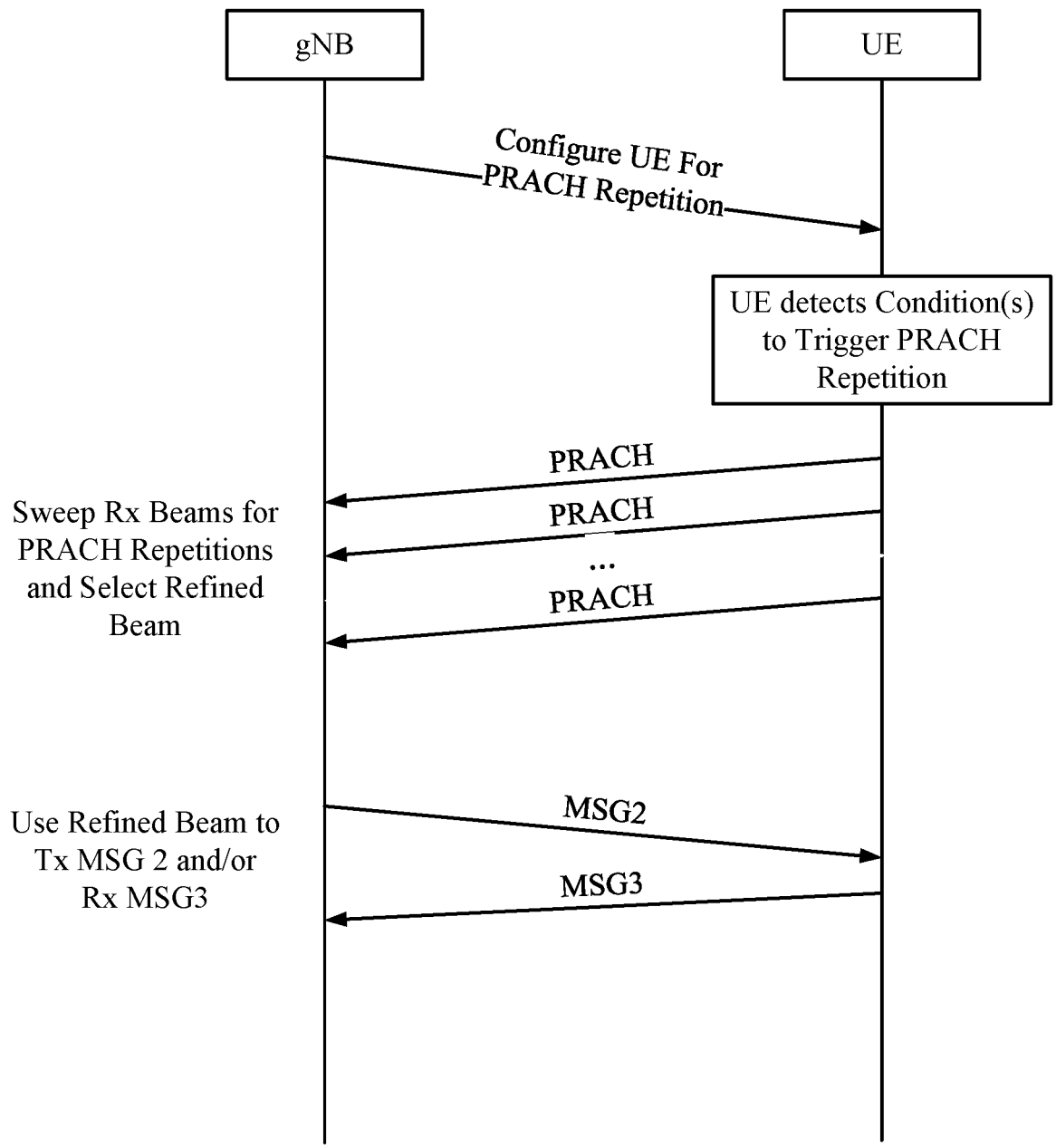
FIG. 13 is a call flow diagram illustrating example operations for beam refinement, in accordance with some aspects of the present disclosure.

PRACH repetition and receive-beam sweep and associated beam refinement for MSG3 and/or MSG2 in accordance with operations 1100 and 1200 of FIGS. 11 and 12 may be understood with reference to the example flow diagram of FIG. 13.

As illustrated in FIG. 13, a gNB configures a UE for PRACH repetitions. In some cases, the configuration may indicate resources for the PRACH repetition and/or may indicate one or more conditions to trigger the UE to send PRACH repetitions (e.g., conditions indicate beam refinement may be beneficial).

As illustrated, the UE detects conditions to trigger PRACH repetitions, and thus sends PRACH repetitions to the gNB. The gNB performs receive beam sweeps for the PRACH repetitions, and selects a refined beam. At a later time, the network entity uses the refined beam to transmit MSG2 to the UE and/or receive MSG3 from the UE.

Certain aspects of the present disclosure are direct to an implementation of a combined control element (CE) for MSG1, MSG2, and MSG3 by repeating PRACH repetitions and/or receive beam sweeping. PRACH repetitions and/or receive-beam sweeps, especially of MSG1, may be used for beam refinement of MSG2 and/or MSG3.

In certain aspects, UEs may use PRACH repetition on specific PRACH time resources dedicated for PRACH repetition. The gNB performs receive beam sweeping on the PRACH repetitions (e.g., using a different receive (Rx) beam each repetition) to refine the beam (e.g., a Rx beam for MSG3 reception and/or a corresponding transmit (Tx) beam MSG2 transmission).

In some cases, usage of the dedicated PRACH resources (i.e., dedicated for PRACH repetition) may depend on a synchronization signal beam (SSB) based reference signal received power (RSRP) measurement of the UEs. If the SSB-based RSRP measurement is less than a certain threshold, the UE may use PRACH repetition on the repetition-dedicated resources. In some aspects, time resources for the PRACH repetition may be configured by remaining minimum system information (RMSI) or some other system information (SI). In some aspects, the threshold for the RSRP measurement for selecting PRACH repetition may be configured by RMSI.

In some cases, the gNB may decide to detect the PRACH repetitions separately for each refined beam sweep. In some cases, the gNB may detect the PRACH repetitions after soft combining of the received signals on different refined beams and selecting the refined beam (e.g., for MSG3 reception and/or MSG2 transmission) based on comparing RSRPs for different repetitions.

Figure 14:
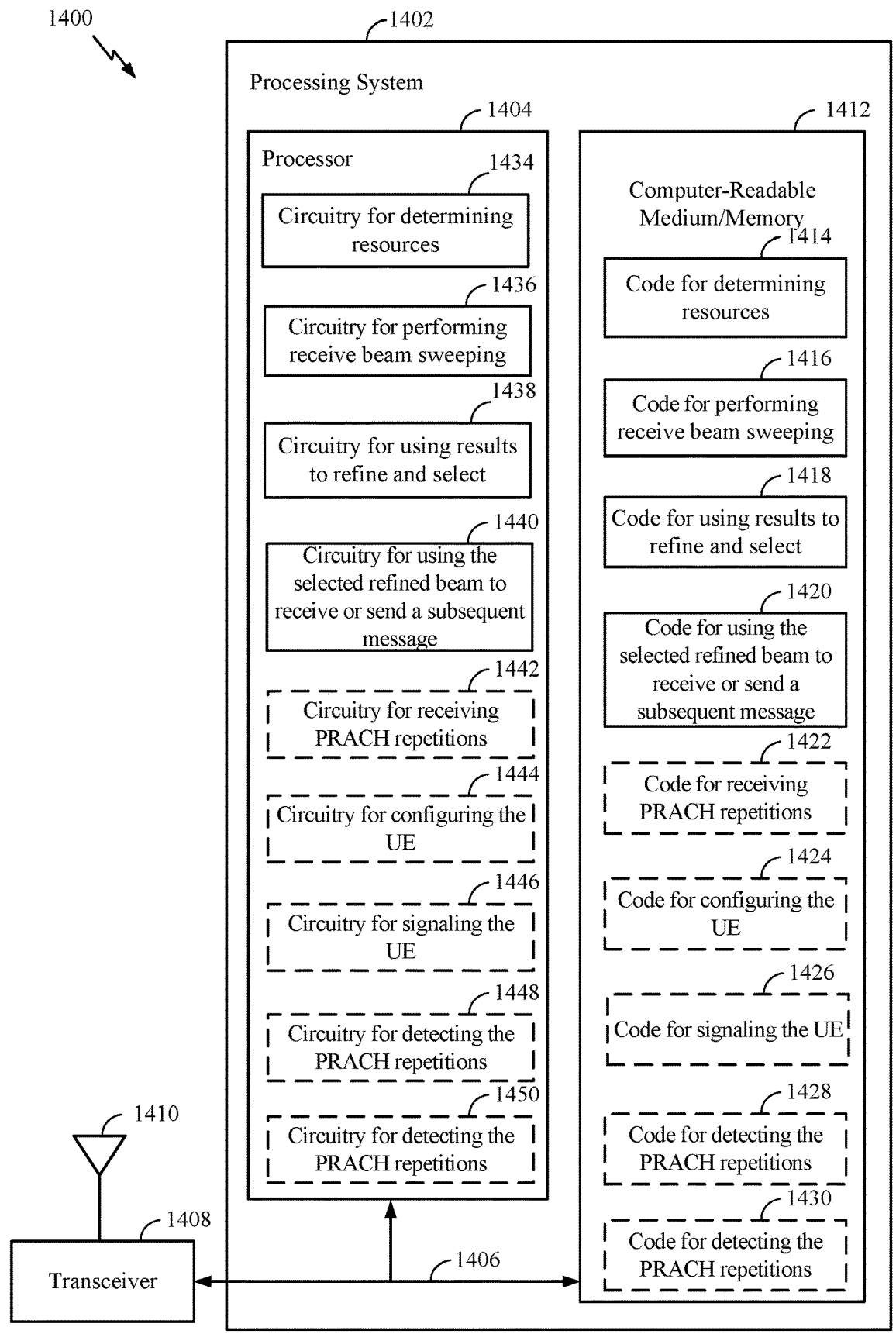
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 11. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 11, or other operations for performing the various techniques discussed herein for beam refinement via PRACH repetitions. In certain aspects, computer-readable medium/memory 1412 stores code 1414 for determining resources to monitor for a physical random access channel (PRACH) transmission sent from a user equipment (UE) as part of a random access channel (RACH) procedure; code 1416 for performing receive beam sweeping when receiving PRACH repetitions sent using the determined resources; circuitry 1418 for using results of the receive beam sweeping to refine one or more beams and to select a refined beam of the refined one or more beams; and circuitry 1420 for using the selected refined beam for at least one of receiving a subsequent message from the UE as part of the RACH procedure or sending a subsequent message to the UE as part of the RACH procedure. In certain aspects, computer readable medium/memory 1412 may store code 1422 for receiving, from the UE, PRACH repetitions using the determined resources when one or more conditions are met. In certain aspects, computer readable medium/memory 1412 may store code 1424 for configuring the UE to send PRACH repetitions using the determined resources if the SSB-based RSRP measurement is less than a threshold value. In certain aspects, computer readable medium/memory 1412 may store code 1426 for signaling the UE an indication of time resources for the PRACH repetitions. In certain aspects, computer readable medium/memory 1412 may store code 1428 for detecting the PRACH repetitions separately for each refined beam sweep. In certain aspects, computer readable medium/memory 1412 may store code 1430 for detecting the PRACH repetitions after soft combining of received signals on different refined beams of the refined one or more beams. In certain aspects, the processor 1404 has circuitry configured to implement the code stored in the computer-readable medium/memory 1412. The processor 1404 includes circuitry 1434 for determining resources to monitor for a PRACH transmission sent from a UE as part of a RACH procedure; circuitry 1436 for performing receive beam sweeping when receiving PRACH repetitions sent using the determined resources; circuitry 1438 for using results of the receive beam sweeping to refine one or more beams and to select a refined beam of the refined one or more beams; and circuitry 1440 for using the selected refined beam for at least one of receiving a subsequent message from the UE as part of the RACH procedure or sending a subsequent message to the UE as part of the RACH procedure. In certain aspects, processor 1404 may include circuitry 1442 for receiving, from the UE, PRACH repetitions using the determined resources when one or more conditions are met. In certain aspects, processor 1404 may include circuitry 1444 for configuring the UE to send PRACH repetitions using the determined resources if the SSB-based RSRP measurement is less than a threshold value. In certain aspects, processor 1404 may include circuitry 1446 for signaling the UE an indication of time resources for the PRACH repetitions. In certain aspects, processor 1404 may include circuitry 1448 for detecting the PRACH repetitions separately for each refined beam sweep. In certain aspects, processor 1404 may include circuitry 1450 for detecting the PRACH repetitions after soft combining of received signals on different refined beams of the refined one or more beams.

For example, means for transmitting (or means for outputting for transmission) may include a transmitter and/or an antenna(s) 234 or the BS 110a illustrated in FIG. 2 and/or circuitry 1440 of the communication device 1400 in FIG. 14. Means for receiving (or means for obtaining) may include a receiver and/or an antenna(s) 234 of the BS 110a illustrated in FIG. 2 and/or circuitry 1440 of the communication device 1400 in FIG. 14. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a illustrated in FIG. 2 and/or the processing system 1402 of the communication device 1400 in FIG. 14.

Figure 15:
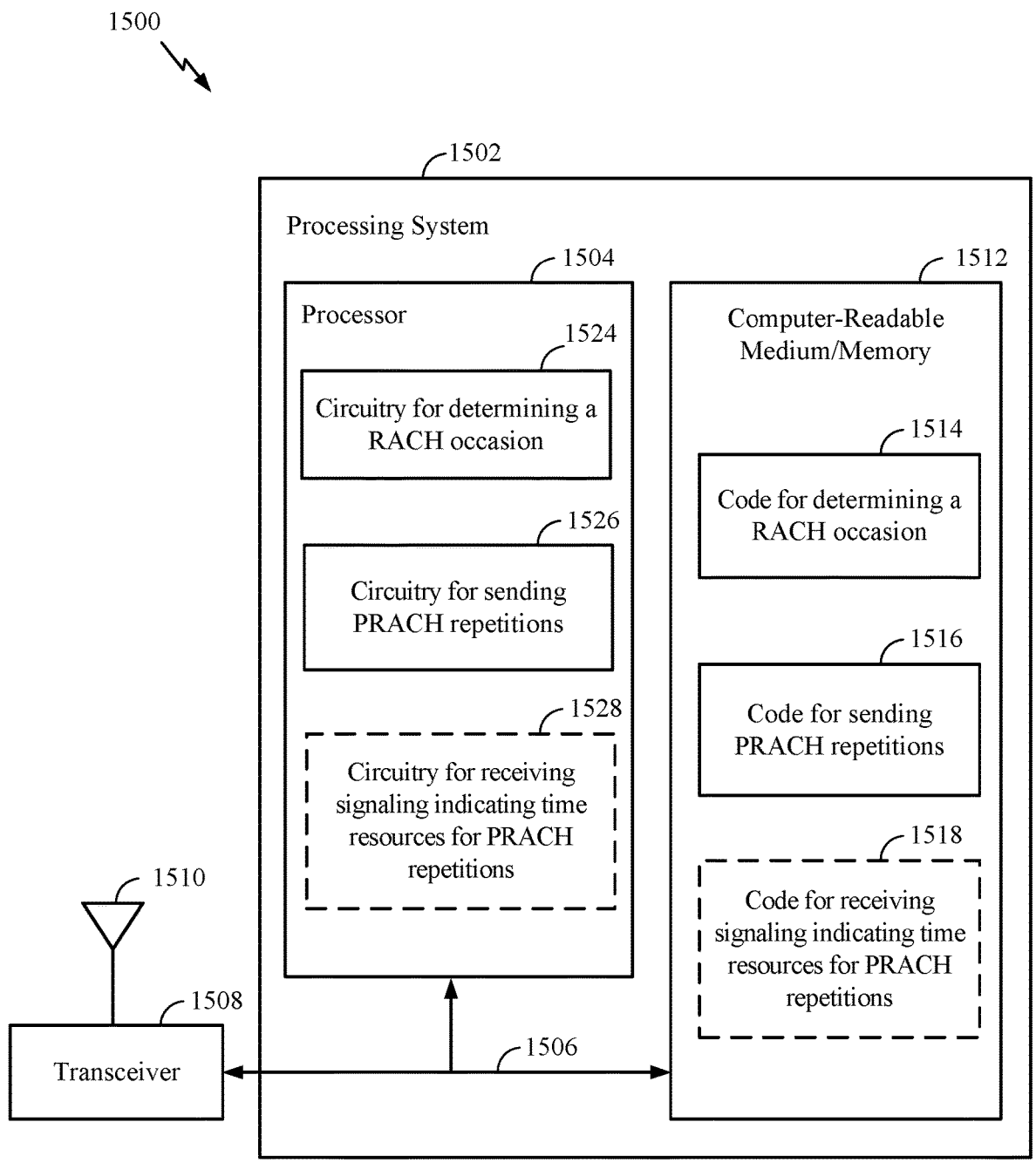
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 12. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 12, or other operations for performing the various techniques discussed herein for beam refinement via PRACH repetitions. In certain aspects, computer-readable medium/memory 1512 stores code 1514 for determining a RACH occasion associated with one or more SSBs beams for sending a PRACH transmission with repetition; and code 1516 for sending PRACH repetitions using resources corresponding to the determined RACH occasion if one or more conditions are met. In certain aspects, computer-readable medium/memory 1512 may store code 1518 for receiving signaling indicating time resources for the PRACH repetitions. In certain aspects, the processor 1504 has circuitry configured to implement the code stored in the computer-readable medium/memory 1512. The processor 1504 includes circuitry 1524 for determining a RACH occasion associated with one or more SSBs beams for sending a PRACH transmission with repetition; circuitry 1526 for sending PRACH repetitions using resources corresponding to the determined RACH occasion if one or more conditions are met. In certain aspects, processor 1504 may include circuitry 1528 for receiving signaling indicating time resources for the PRACH repetitions.

For example, means for transmitting (or means for outputting for transmission) may include the transmitter unit 254 and/or antenna(s) 252 of the UE 120*a* illustrated in FIG. 2 and/or circuitry 1526 of the communication device 1500 in FIG. 15. Means for receiving (or means for obtaining) may include a receiver and/or antenna(s) 252 of the UE 120*a* illustrated in FIG. 2. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120*a* illustrated in FIG. 2 and/or the processing system 1502 of the communication device 1500 in FIG. 15.

Example Aspects

Implementation examples are described in the following numbered clauses:

1. A method for wireless communications by a network entity, comprising: determining resources to monitor for a physical random access channel (PRACH) transmission sent from a user equipment (UE) as part of a random access channel (RACH) procedure; performing receive beam sweeping when receiving PRACH repetitions sent using the determined resources; using results of the receive beam sweeping to refine one or more beams and to select a refined beam of the refined one or more beams; and using the selected refined beam for at least one of receiving a subsequent message from the UE as part of the RACH procedure or sending a subsequent message to the UE as part of the RACH procedure.

2. The method of aspect 1, further comprising: receiving, from the UE, PRACH repetitions using the determined resources when one or more conditions are met.

3. The method of aspect 2, wherein the one or more conditions relate to a synchronization signal block (SSB) based reference signal received power (RSRP) measurement.

4. The method of aspect 3, further comprising configuring the UE to send PRACH repetitions using the determined resources if the SSB-based RSRP measurement is less than a threshold value.

5. The method of aspect 4, wherein configuring the UE with the threshold value comprises configuring the UE with the threshold value via at least one of: remaining minimum system information (RMSI); or some other system information (SI).

6. The method of any of aspects 1-5, further comprising signaling the UE an indication of time resources for the PRACH repetitions.

7. The method of aspect 6, wherein the signaling comprises at least one of: remaining minimum system information (RMSI); or some other system information (SI).

8. The method of any of aspects 1-7, further comprising detecting the PRACH repetitions separately for each refined beam sweep.

9. The method of any of aspects 1-8, further comprising detecting the PRACH repetitions after soft combining of received signals on different refined beams of the refined one or more beams.

10. The method of any of aspect 1-9, wherein selecting the refined beam from the refined one or more beams comprises selecting the refined beam based on comparing reference signal received power (RSRP) for different PRACH repetitions.

11. The method of any of aspects 1-10, wherein the refined one or more beams is a subset of a set of synchronization signal block (SSB) beams.

12. The method of any of aspects 1-11, wherein the resources correspond to one or more RACH occasions.

13. A method for wireless communications by a user equipment (UE), comprising: determining a random access channel (RACH) occasion associated with one or more synchronization signal blocks (SSBs) beams for sending a physical random access channel (PRACH) transmission with repetition; and sending PRACH repetitions using resources corresponding to the determined RACH occasion if one or more conditions are met.

14. The method of aspect 13, wherein the one or more conditions relate to a SSB based reference signal received power (RSRP) measurement.

15. The method of aspect 14, wherein sending the PRACH repetitions comprises sending PRACH repetitions using resources corresponding to the determined RACH occasion if the SSB-based RSRP measurement is less than a threshold value.

16. The method of aspect 15, wherein the threshold value is configured via at least one of: remaining minimum system information (RMSI); or some other SI.

17. The method of any of aspects 13-16, further comprising receiving signaling indicating time resources for the PRACH repetitions.

18. The method of aspect 17, wherein the signaling comprises at least one of: remaining minimum system information (RMSI); or some other system information (SI).

19. An apparatus comprising means for performing the method of any of aspects 1 through 18.

20. An apparatus comprising at least one processor and a memory coupled to the at least one processor, the memory comprising code executable by the at least one processor to cause the apparatus to perform the method of any of aspects 1 through 18.

21. A computer readable medium storing computer executable code thereon for wireless communications that, when executed by at least one processor, cause an apparatus to perform the method of any of aspects 1 through 18.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2 NR is an emerging wireless communications technology under development.

In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be used interchangeably A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 11-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g.,

RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

What is claimed is:

1. A method for wireless communications by a network entity, comprising:
   determining resources to monitor for a physical random access channel (PRACH) transmission sent from a user equipment (UE) as part of a random access channel (RACH) procedure;
   performing receive beam sweeping when receiving PRACH repetitions sent using the determined resources;
   using results of the receive beam sweeping to refine one or more beams and to select a refined beam of the refined one or more beams; and
   using the selected refined beam for at least one of receiving a subsequent message from the UE as part of the RACH procedure or sending a subsequent message to the UE as part of the RACH procedure.

2. The method of claim 1, further comprising: receiving, from the UE, PRACH repetitions using the determined resources when one or more conditions are met.

3. The method of claim 2, wherein the one or more conditions relate to a synchronization signal block (SSB) based reference signal received power (RSRP) measurement.

4. The method of claim 3, further comprising configuring the UE to send PRACH repetitions using the determined resources if the SSB-based RSRP measurement is less than a threshold value.

5. The method of claim 4, wherein configuring the UE with the threshold value comprises configuring the UE with the threshold value via at least one of:
   remaining minimum system information (RMSI); or
   some other system information (SI).

6. The method of claim 1, further comprising signaling the UE an indication of time resources for the PRACH repetitions.

7. The method of claim 6, wherein the signaling comprises at least one of:
   remaining minimum system information (RMSI); or
   some other system information (SI).

8. The method of claim 1, further comprising detecting the PRACH repetitions separately for each refined beam sweep.

9. The method of claim 1, further comprising detecting the PRACH repetitions after soft combining of received signals on different refined beams of the refined one or more beams.

10. The method of claim 1, wherein selecting the refined beam from the refined one or more beams comprises selecting the refined beam based on comparing reference signal received power (RSRP) for different PRACH repetitions.

11. The method of claim 1, wherein the refined one or more beams is a subset of a set of synchronization signal block (SSB) beams.

12. The method of claim 1, wherein the resources correspond to one or more RACH occasions.

13. An apparatus for wireless communications, comprising:
   at least one processor; and
   a memory coupled to the at least one processor, the memory comprising code executable by the at least one processor to cause the apparatus to:
      determine resources to monitor for a physical random access channel (PRACH) transmission sent from a user equipment (UE) as part of a random access channel (RACH) procedure;
      perform receive beam sweeping when receiving PRACH repetitions sent using the determined resources;
      use results of the beam sweeping to refine one or more beams and to select a refined beam from the refined one or more beams; and
      use the selected refined beam for at least one of receiving a subsequent message from the UE as part of the RACH procedure or sending a subsequent message to the UE as part of the RACH procedure.

14. The apparatus of claim 13, wherein the memory further comprises code executable by the at least one processor to cause the apparatus to receive, from the UE, PRACH repetitions using the determined resources when one or more conditions are met.

15. The apparatus of claim 14, wherein the one or more conditions relate to a synchronization signal block (SSB) based reference signal received power (RSRP) measurement.

16. The apparatus of claim 15, wherein the memory further comprises code executable by the at least one processor to cause the apparatus to configure the UE to send PRACH repetitions using the determined resources if the SSB-based RSRP measurement is less than a threshold value.

17. The apparatus of claim 16, wherein the code executable by the at least one processor to cause the apparatus to configure the UE with the threshold value comprises code executable by the at least one processor to cause the apparatus to configure the UE with the threshold value via at least one of:
   remaining minimum system information (RMSI); or
   some other system information (SI).

18. The apparatus of claim 13, wherein the memory further comprises code executable by the at least one processor to cause the apparatus to signal the UE an indication of time resources for the PRACH repetitions, wherein the code executable by the at least one processor to cause the apparatus to signal involves at least one of:
   remaining minimum system information (RMSI); or
   some other system information (SI).

19. The apparatus of claim 13, wherein the memory further comprises code executable by the at least one processor to cause the apparatus to detect the PRACH repetitions separately for each refined beam sweep.

20. The apparatus of claim 13, wherein the memory further comprises code executable by the at least one processor to cause the apparatus to detect PRACH repetitions after soft combining of received signals on different refined beams of the refined one or more beams.

21. The apparatus of claim 13, wherein the code executable by the at least one processor to cause the apparatus to select the refined beam from the refined one or more beams comprises code executable by the at least one processor to cause the apparatus to select the refined beam based on comparing reference signal received power (RSRP) for different PRACH repetitions.

22. The apparatus of claim 13, wherein the refined one or more beams is a subset of a set of synchronization signal block (SSB) beams.

23. The apparatus of claim 13, wherein the resources correspond to one or more RACH occasions.

24. An apparatus for wireless communications, comprising:
- means for determining resources to monitor for a physical random access channel (PRACH) transmission sent from a user equipment (UE) as part of a random access channel (RACH) procedure;
- means for performing receive beam sweeping when receiving PRACH repetitions sent using the determined resources;
- means for using results of the beam sweeping to refine one or more beams to and to select a refined beam from the refined one or more beams; and
- means for using the selected refined beam for at least one of:
  - receiving a subsequent message from the UE as part of the RACH procedure; or
  - sending a subsequent message to the UE as part of the RACH procedure.

\* \* \* \* \*